United States Patent [19]
Lucas et al.

[11] Patent Number: 5,544,167
[45] Date of Patent: Aug. 6, 1996

[54] TRANSMISSION METHOD FOR CDMA RADIOTELEPHONE COMMUNICATIONS, AND APPARATUSES FOR IMPLEMENTING SUCH METHOD

[75] Inventors: Philippe Lucas, Palaiseau; Philippe Mege, Bourg La Reine, both of France

[73] Assignee: Matra Communication, Quimper, France

[21] Appl. No.: 289,375

[22] Filed: Aug. 12, 1994

[30] Foreign Application Priority Data

Aug. 13, 1993 [FR] France .................. 93 09960

[51] Int. Cl.⁶ ............................ H04B 7/216; H04B 7/06
[52] U.S. Cl. ............................................ 370/18; 370/20
[58] Field of Search ............................ 370/18, 20, 19, 370/21, 74, 69.1, 76, 95.1, 121; 375/205, 206, 208, 200, 267, 349; 455/33.1, 33.2, 33.4

[56] References Cited

U.S. PATENT DOCUMENTS

| | | | |
|---|---|---|---|
| 4,888,788 | 12/1989 | Teranishi et al. | 375/205 |
| 4,962,507 | 10/1990 | Renshaw | 375/205 |
| 4,995,052 | 2/1991 | Thorvaldsen | 375/206 |
| 5,101,501 | 3/1992 | Gilhousen et al. | 375/205 |
| 5,109,390 | 4/1992 | Gilhousen et al. | 375/205 |
| 5,237,586 | 8/1993 | Bottomley | 370/18 |
| 5,241,561 | 8/1993 | Barnard | 375/206 |
| 5,276,705 | 1/1994 | Higgins | 375/208 |
| 5,289,499 | 2/1994 | Weerackody | 375/206 |
| 5,394,435 | 2/1995 | Weerackody | 370/18 |

FOREIGN PATENT DOCUMENTS 4010274  10/1990  Germany.

OTHER PUBLICATIONS

"Theory of Spread–Spectrum Communications —A Tutorial" R. L. Pickholtz D. L. Schilling and L. B. Milstein —IEEE Transactions on communications vol. COM-30, N°5, May 1982—pp. 855–884.

*Primary Examiner*—Benedict V. Safourek
*Assistant Examiner*—Chau T. Nguyen
*Attorney, Agent, or Firm*—Larson and Taylor

[57] ABSTRACT

A base station constructs CDMA channels, each defined by a respective spreading sequence which modulates information bits to be transmitted for forming a respective channel signal. The different channel signals are combined, and then modulated on a carrier frequency, so as to produce a phase shift keyed radio signal which is transmitted towards mobile stations. Each spreading sequence has only one real component. For producing the radio signal, a relative phase shift is applied between different channel signals.

25 Claims, 5 Drawing Sheets

TRANSMISSION METHOD FOR CDMA RADIOTELEPHONE COMMUNICATIONS, AND APPARATUSES FOR IMPLEMENTING SUCH METHOD

BACKGROUND OF THE INVENTION

The present invention relates to code-division multiple access (CDMA) radiotelephone communications.

CDMA is a method of spread spectrum digital communication in which a plurality of transmission channels are created by using spreading sequences for each channel that modulate the information bits to be transmitted. The spreading sequences operate at a chip rate higher than the data bit rate in order to achieve spectrum spreading of the radio signal. Their self and cross-correlation properties are adapted to enable the various channels to be multiplexed: they are generally pseudorandom sequences that are mutually orthogonal or quasi-orthogonal, taking chip values of −1 or +1.

The use of CDMA in the field of cellular radiotelephony is described in chapter I of the work "Mobile radio communications" by Raymond Steele, Pentech Press, London 1992, and also in the article "On the system design aspects of code division multiple access (CDMA) applied to digital cellular and personal communications networks" by A. Salmasi and K. S. Gilhousen, Proc. of the 41st IEEE Vehicular Technology Conference, St. Louis, Mo., May 19–22, 1991 and in U.S. Pat. No. 5,103,459. The multiplexed transmission channels are formed at the base station of each cell in the network. Each mobile station situated within the cell uses a special spreading sequence to recover, from the overall radio signal transmitter the base station, the data bits that are adressed thereto.

In the system described in the above publications, the spreading sequences are complex, i.e. each of them is made of two real pseudo-random sequences forming, respectively, the real part of the spreading sequence which modulates the bits to be transmitted in order to form an in-phase component, and the imaginary part of the spreading sequence which modulates the same bits in order to form a quadrature component.

This modulation scheme is illustrated by the diagram of FIG. 1 which shows the modulation stage of a conventional base station. In this diagram, there are shown m voice communication channels over which voice information bits D1(t), . . . , Dm(t) previously encoded by conventional techniques (block coding, interleaving . . . ) are transmitted, a service channel over which data DS(t) used for communication management are transmitted, and a pilot channel over which no information bits are transmitted.

A complex pilot sequence $CP=(CP_I, CP_Q)$ used for synchronizing mobile stations and for estimating propagation paths is transmitted over the pilot channel. In the service channel, two multipliers 10,11 are used for modulating the data DS(t) by the complex spreading sequence $CS=(CS_I, CS_Q)$. In each voice communication channel, two multipliers 12,13 are used for modulating the bits D1 (t), . . . , Dm(t). After a digital-to-analog conversion 14, the in-phase components relating to the various CDMA channels are summed (adder 16), as well as the quadrature components (adder 17), in order to form an in-phase signal I and a quadrature signal Q. The carrier modulation stage 20 performs quadrature phase shift keying (QPSK): two radio waves in quadrature are provided by a local oscillator 18 and a π/2 dephasor 19, and then modulated by the in-phase and quadrature signals I,Q by means of mixers 21,22. The two quadrature-modulated waves are summed in 23, and the resulting radio signal is subjected to bandpass filtering 24 and amplification 26 before being transmitted within the cell by the omnidirectional antenna 27.

For receiving the information bits Dk(t) that are adressed thereto, a mobile station comprises a conventional CDMA receiver, such as the one shown in the diagram of FIG. 2. The radio signal received on antenna 31 is first subjected to amplification 32 and bandpass filtering 33 before being delivered to the carrier demodulation stage 34. The latter comprises a local oscillator 36 and a π/2 dephasor 37 which deliver two quadrature radio waves at the carrier frequency which are used to produce an in-phase component $r_I$ and a quadrature component $r_Q$. The first radio wave is mixed with the received signal in 38, and the resulting signal is low-pass filtered by filter 39 before being digitalized by the analog-to-digital converter 41 to provide $r_I$. The quadrature wave is mixed with the received signal in 42, and the resulting signal is low-pass filtered by filter 43 before being digitalized by the converter 44 to provide $r_Q$.

The receiver is usually a diversity receiver when it is desired to take advantage of several simultaneous propagation paths, as allowed for by CDMA (in this respect, see U.S. Pat. No. 5,109,390). Accordingly, a rake receiver includes a plurality of receiving arms each performing signal reception on a particular path, the results delivered by each arm being combined to improve the reception performances. Each path is detected based on the signal transmitted on the pilot channel. This procedure also enables to perform a soft handoff when the mobile station moves from one cell to another cell (see U.S. Pat. No. 5,101,501).

FIG. 2 illustrates the conventional configuration of one arm of the rake receiver (the processing applied to the service channel is not illustrated in order to simplify the figure). The pilot channel processing module 46 comprises four correlators 47 for calculating the correlations between each one of the in-phase and quadrature components $r_I$, $r_Q$ and each one of the real and imaginary parts of the pilot sequence $CP=(CP_I, CP_Q)$. The sum of the correlation between $r_I$ and $CP_I$ and of the correlation between $r_Q$ and $CP_Q$, calculated in 48, forms the real part of a complex signal $Ae^{j\phi}$ which is an estimation of the amplitude and phase response of the propagation path. The difference between the correlation between $r_Q$ and $CP_I$ and the correlation between $r_I$ and $CP_Q$, calculated in 49, forms the imaginary part of the estimation $Ae^{j\phi}$. The complex conjugate $Ae^{-j\phi}$ of this estimation, calculated in 51, is addressed to a voice communication channel processing module 52. The latter includes four correlators 47, an adder 48 and a subtractor 49 having the same arrangement as those of module 46, the correlations being calculated with the complex spreading sequence pertaining to the channel $Ck=(Ck_I, Ck_Q)$. A complex multiplier 53 multiplies the complex signal output by adder 48 and subtractor 49 of module 52 by $Ae^{-j\phi}$, so as to provide a real signal which is representative of the information bits transmitted over the channel. A threshold comparator 54 deduces the information bits Dk(t) from this real signal.

Regarding the uplink, from mobile stations to a base station, the usual practice is also to use complex spreading sequences and QPSK modulation.

The use of complex sequences tends to complicate the equipments in the base stations and the mobile stations. In particular, it has been shown that demodulation of the received signal involves the computation of four correlations, each of them requiring a high performance correlator, capable of performing the computations at a rate at least equal to the chip rate of the spreading sequences (typically of the order of a few megahertz). It would be desirable to propose a modulation and demodulation scheme enabling to simplify the equipments required for its implementation.

Theoretically, it is possible to use real spreading sequences and binary phase shift keying (BPSK)(see, e.g., "Theory of Spread-Spectrum Communications—A Tutorial" by R. L. Pickholtz et al, IEEE Transactions on Communications, Vol. COM-30, No. 5, May 1982). However, such solution is not optimal as regards interchannel interferences. The residual cross-correlation between the spreading sequences (which is not exactly zero because the pseudorandom sequences are not exactly orthogonal) causes interchannel interferences which appear as a white noise in the signal obtained after the correlation. It is an advantage of the use of complex spreading sequences to reduce the level of such noise. This can be understood by considering, by way of example, the ideal transmission, over a single non-noisy path with $Ae^{j\phi}=1$, of a radio signal obtained by combining information bits $D1, \ldots, Dm$ on m CDMA channels. Then, the complex signal received by the mobile station after carrier demodulation can be expressed as:

$$r_I + jr_Q = \frac{1}{2} \sum_{i=1}^{m} Di(t) \times (Ci_I(t) + jCi_Q(t))$$

Once channel k has been processed by module 52 of FIG. 2, the estimation of a bit Dk can be expressed as ($T_b$ designating the duration of an information bit used as the integration time in the correlators 47):

$$est(Dk) = \frac{1}{T_b} \int_{T_b} (r_I + jr_Q) \times (Ck_I - jCk_Q)dt = \tag{1}$$

$$\frac{1}{2T_b} \times \int_{T_b} Dk\|Ck\|^2 dt + \frac{1}{2T_b} \sum_{i \neq k} \int_{T_b} Di \times$$

$$(Ci_I + jCi_Q) \times (Ck_I - jCk_Q)dt =$$

$$Dk + \sum_{i \neq k} \frac{Di}{2T_b} \int_{T_b} (Ci_I Ck_I + Ci_Q Ck_Q)dt +$$

$$j \sum_{i \neq k} \frac{Di}{2T_b} \int_{T_b} (Ci_Q Ck_I - Ci_I Ck_Q)dt$$

The last two terms represent the noise caused by the interferers. The third term is not problematic because it is purely imaginary while Dk is obtained on the real axis. In the second term, the contributions of the cross-correlations $Ci_I Ck_I$ and $Ci_Q Ck_Q$ are non-coherently summed when the sequences are complex with independent real and imaginary parts, while they are coherently summed when the sequences are real ($Ci_I = Ci_Q$ for any i). Therefore, the use of complex sequences gives rise to a gain of about 3dB on the signal-to-interferers ratio (SIR) as compared with the use of real sequences.

That is why real spreading sequences are not used in the known CDMA systems, in spite of the substantial simplification that they would provide.

SUMMARY OF THE INVENTION

An object of the present invention is to allow for the use of real spreading sequences while reducing the above-mentioned drawbacks relating to interchannel interferences.

The invention thus provides a transmission method for CDMA communications, wherein a base station establishes a plurality of CDMA channels each defined by a respective spreading sequence modulating information bits to be transmitted so as to form a respective channel signal, and the different channel signals are combined and then modulated on a carrier frequency so as to produce a phase shift keyed radio signal transmitted to mobile stations, wherein each spreading sequence has only one real component, and wherein, for producing the radio signal, a relative phase shift is applied between different channel signals.

Owing to the phase distribution among the channel signals, it is possible to reduce the influence of interchannel interferences, as an alternative to the use of complex spreading sequences.

In a particularly simple embodiment of the invention, the channel signals are distributed in n groups, n designating an integer at least equal to 2, and the channel signals of a same group are summed to form a modulation component which modulates a respective radio wave at the carrier frequency, the radio waves relating to the different groups having phase shifts multiple of $\pi/2^{n-1}$ therebetween.

An other possibility is to assign a particular phase shift to each channel signal.

For the uplinks, a similar scheme can be adopted. The uplink radio signal transmitted from a mobile station to a base station is then a CDMA signal in which information bits are modulated by a spreading sequence having only one real component, and then modulated on a carrier frequency by phase shift keying. The distribution of the phases among the uplink channels results from the differences in the propagation paths between the mobile stations and the base station.

The method according to the invention enables to substantially simplify the equipments required for the transmission and the reception, as compared to those required for handling complex sequences. In a second aspect, the invention thus provides a CDMA modulator for producing a downlink radio signal from a base station to mobile stations of a radiotelephone network, comprising multiplexing and a spectrum spreading means for defining a plurality of CDMA channels in which respective channel signals are formed by modulating information bits to be transmitted with a respective spreading sequence, means for combining the different channel signals, and carrier modulation means for producing a phase shift keyed radio signal from the combinations of the different channel signals, wherein each spreading sequence has only one real component, and wherein the combination means are arranged for applying a relative phase shift between different channel signals in the radio signal.

According to a third aspect of the invention, a CDMA demodulator, suitable for receiving, at a mobile station, information bits transmitted over at least one CDMA channel by a base station including a CDMA modulator of the above-mentioned type, comprises carrier demodulation means producing an in-phase component and a quadrature component from the radio signal transmitted by the base station, a first correlator calculating a correlation between the in-phase component and the spreading sequence corresponding to the CDMA channel, a second correlator calculating a correlation between the quadrature component and the spreading sequence corresponding to the CDMA channel, a complex multiplier having an input which receives the complex number having respectively, as real and imaginary parts, the outputs of the first and second correlators, and another input which receives an estimation taking into account the phase shift introduced by a propagation path and the phase shift assigned to the CDMA channel, and comparison means receiving the real part of the output of the complex multiplier and restoring the transmitted information bits.

Alternatively, the CDMA demodulator may comprise a complex multiplier having an input which receives the complex number having respectively, as real and imaginary parts, the in-phase and quadrature components, and another input which receives an estimation taking into account the phase shift introduced by a propagation path and the phase shift assigned to the CDMA channel, a correlator calculating a correlation between the real part of the output of the complex multiplier and the spreading sequence corresponding to the CDMA channel, and comparison means receiving the output of the correlator and restoring the transmitted information bits.

BRIEF DESCRIPTION OF THE DRAWINGS

The above-discussed

DESCRIPTION OF PREFERRED EMBODIMENTS

Figure 1:
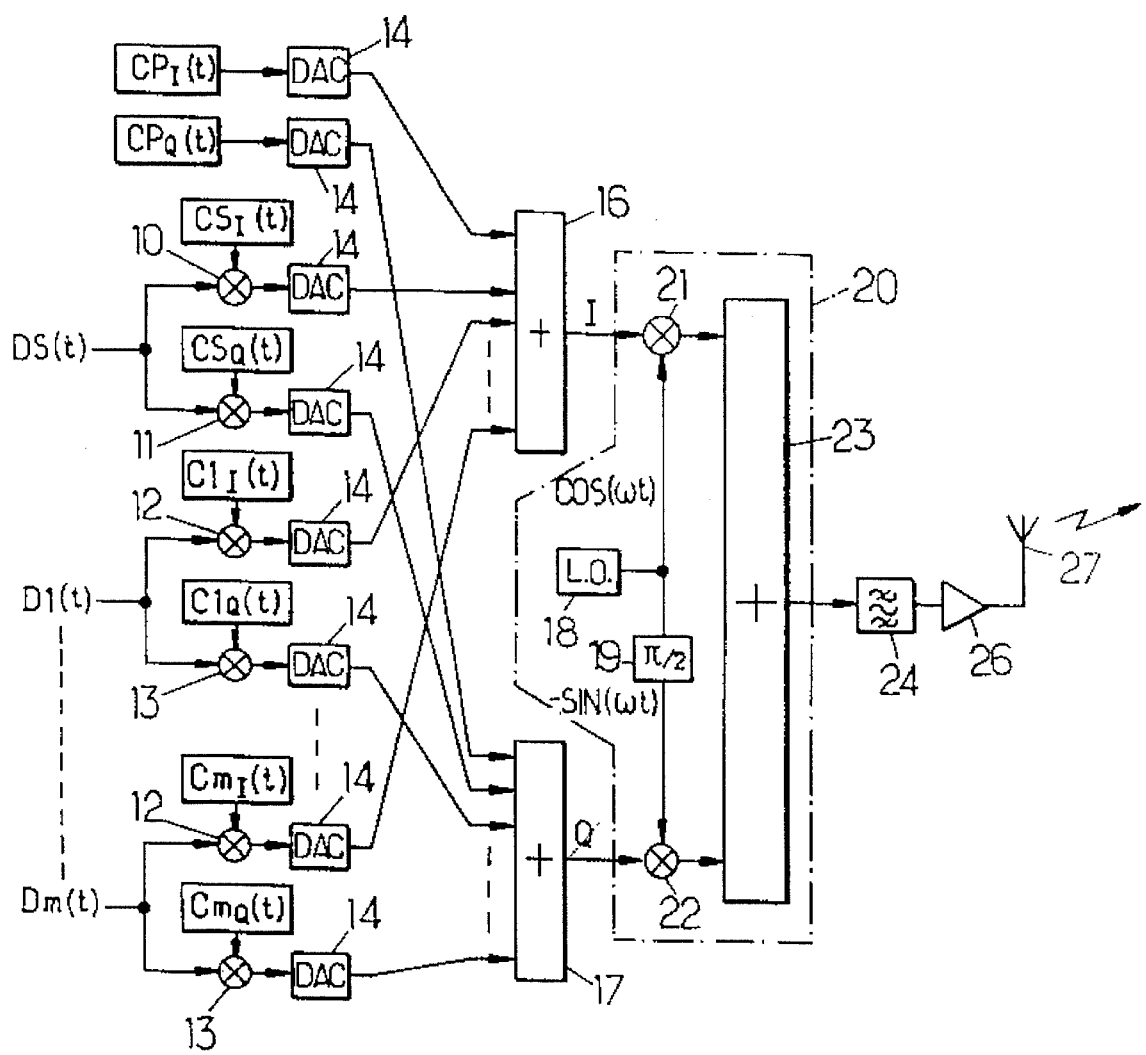
FIGS. 1 and 2 are diagrams showing the modulator of a base station of a radiotelephone network and the demodulator of a mobile station, having the conventional configuration of CDMA systems.
Figure 2:
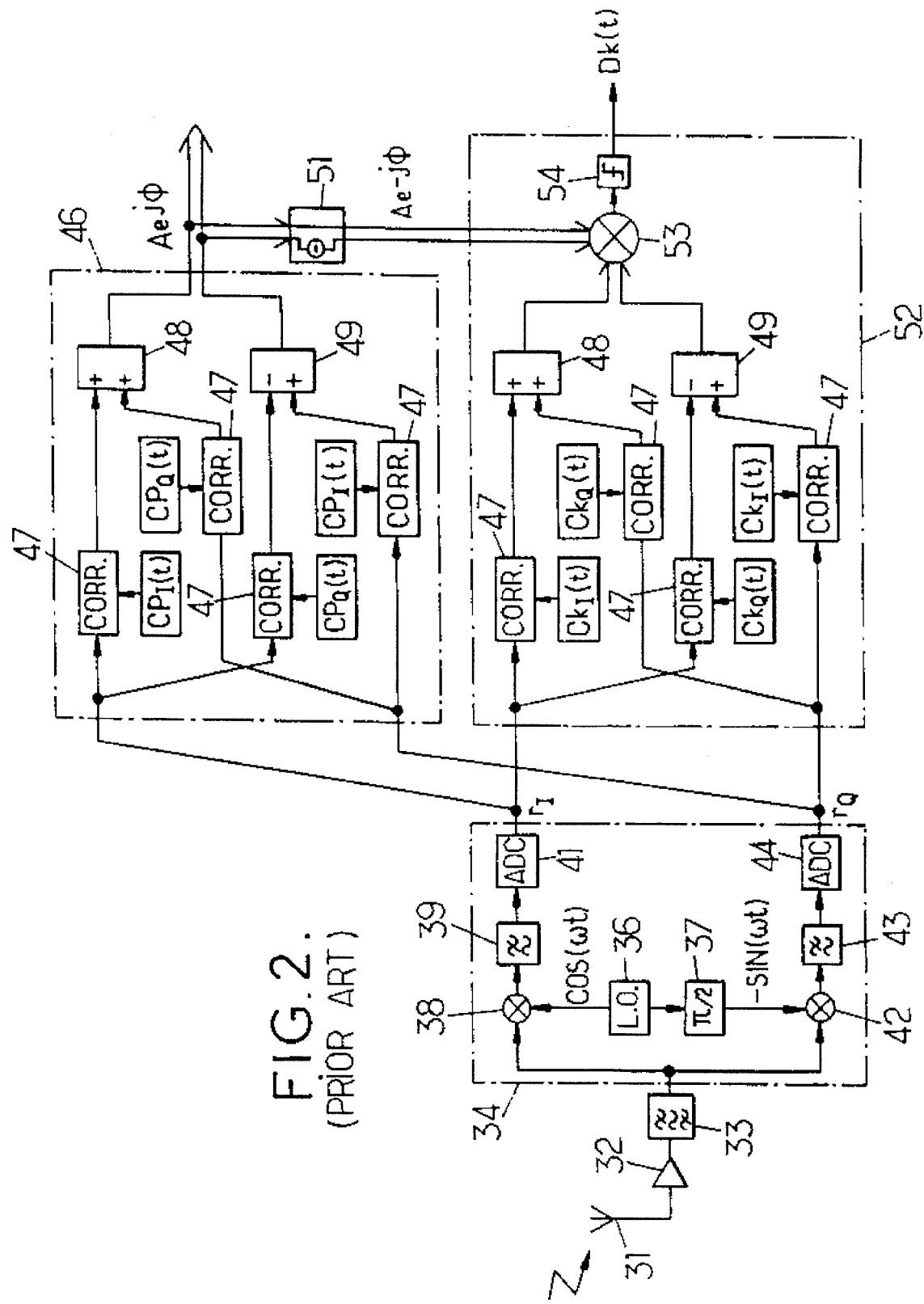
Figure 3:
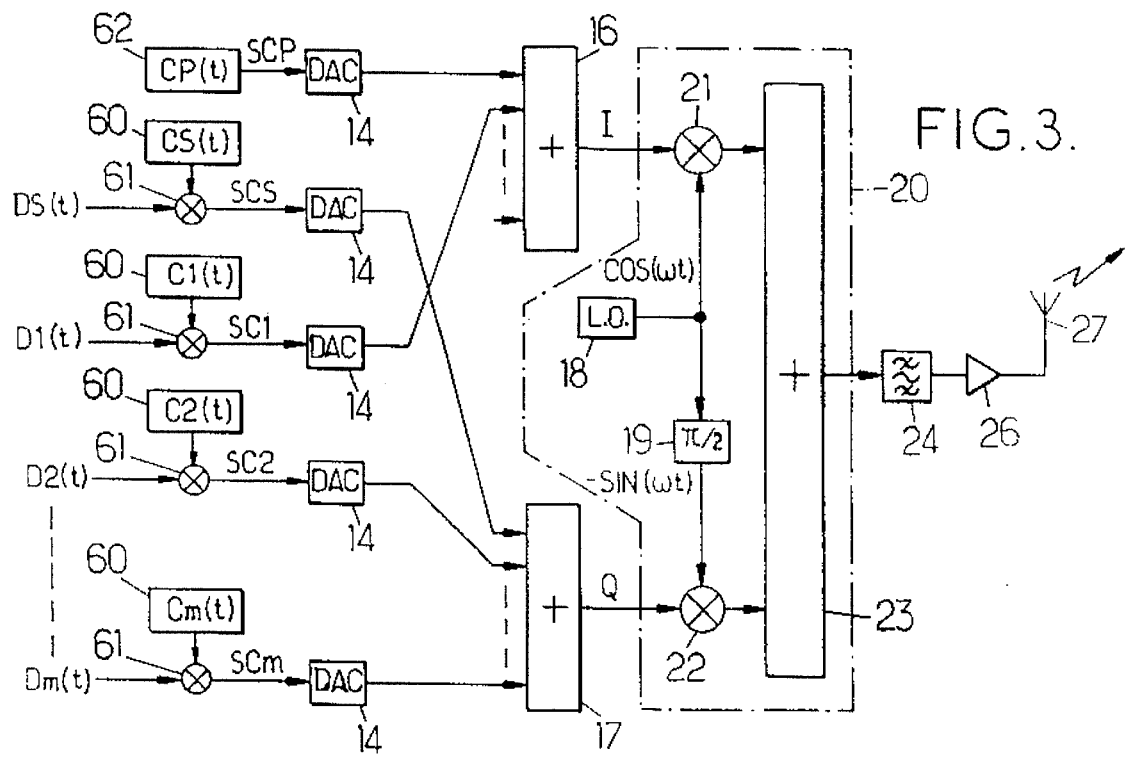
FIGS. 3 and 4 are two diagrams similar to that of FIG. 1, showing two embodiments of a CDMA modulator according to the invention, for use in the transmission part of a base station.
Figure 4:
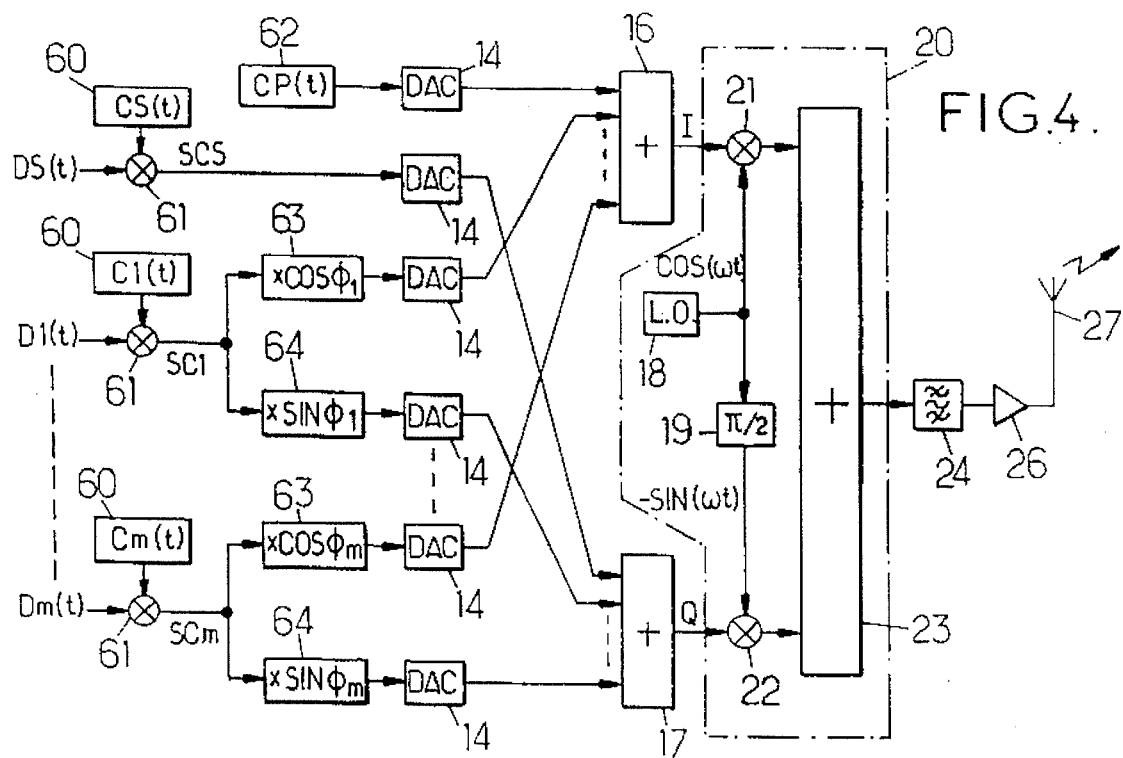
Figure 5:
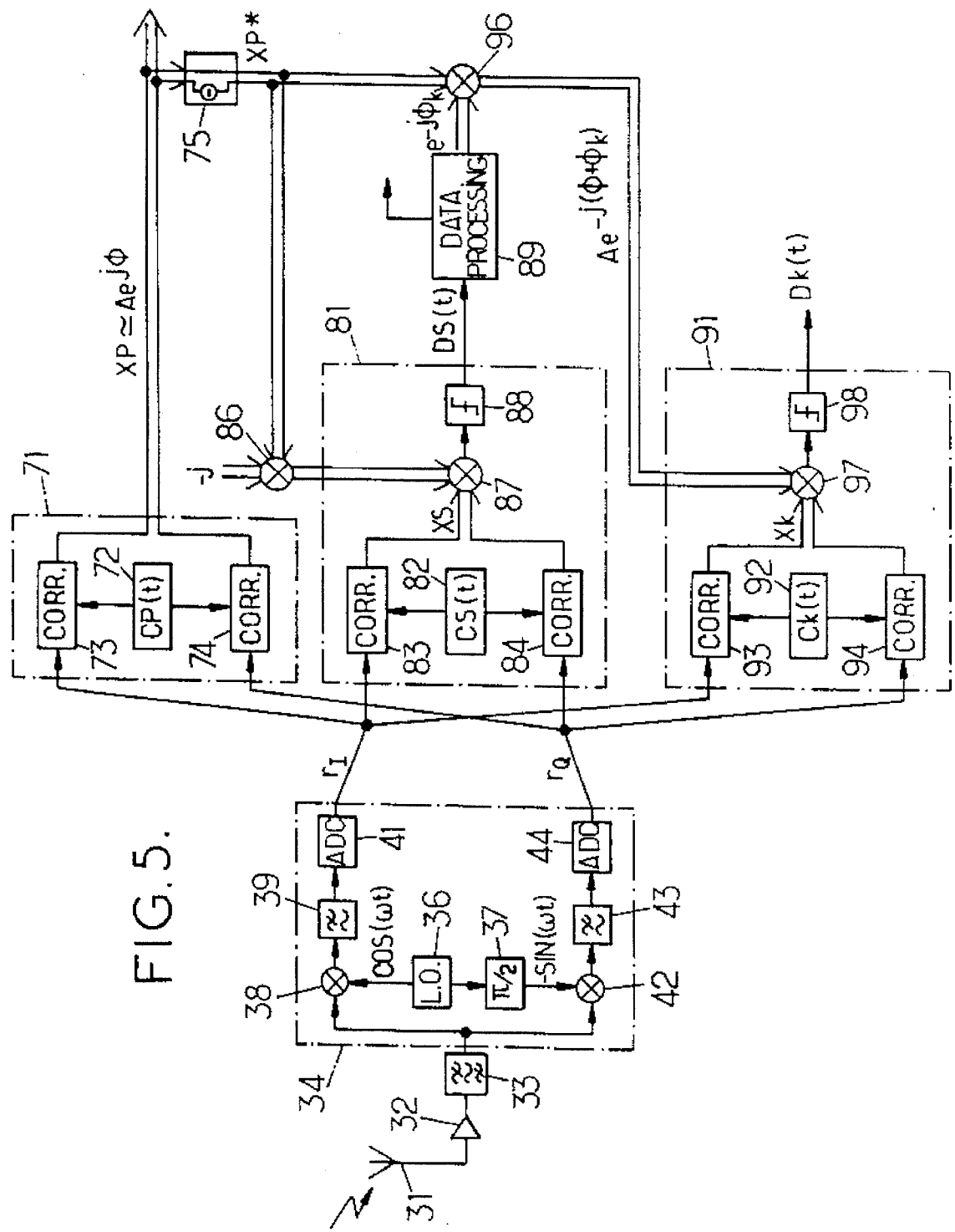
FIG. 5 is a diagram showing a CDMA demodulator according to the invention, for use in the reception part of a mobile station.

For the sake of clarity, identical reference numerals are used in FIGS. 3 to 5 and in FIGS. 1 and 2 for designating similar elements.

In a cellular radiotelephone system, base stations are distributed over the territory that is to be covered. In the zone or "cell" covered by a given base station, a plurality of mobile station may communicate simultaneously with the base station.

Each base station, such as those shown in FIGS. 3 and 4, sets up CDMA transmission channels each defined by a respective spreading sequence CP, CS, C1, . . . , Cm. The spreading sequences, whose samples or "chips" take the values +1 or −1 are periodic, pseudorandom, and substantially decorrelated. They are at a chip rate that is higher than the bit rate of the data bits to be transmitted, for exemple they are at a rate of 1 MHz. Each of the sequences, C1, . . . , Cm corresponding to the voice communication channels is characteristic of the user (mobile station) with which a communication is established over the corresponding channel. In the service channel and in each voice communication channel, the information bits to be transmitted DS, D1, . . . , Dm, which represent voice or data signals previously encoded by conventional techniques, are multiplied in 61 by the spreading sequence CS, C1, . . . , Cm produced by a suitable generator 60 in order to form a channel signal SCS, SC1, . . . , SCm whose frequency spectrum is spread with respect to that of the information bit transmitted over the CDMA channels.

The information bits DS represent data useful for initializing arid controlling the communications with the mobile stations.

No information bits are transmitted on the pilot channel. The pilot channel signal SCP is merely constituted by the spreading sequence CP which is a pilot reference sequence produced by a generator 62.

The different channel signals are mutually combined to form an in-phase modulation component I and a quadrature modulation component Q. Those two components are then submitted to phase shift keying, as in the case of FIG. 1, by the carrier modulation stage 20 which is analogous to a QPSK modulation stage. The resulting signal is filtered, amplified, and then transmitted via the antenna 27.

The method according to the invention can be considered as a particular way of combining the channel signals, so that there is a relative phase shift between different channel signals in the radio signal, with the spreading sequences each having only one real component.

In the embodiment of FIG. 3, the channel signals are distributed in two groups. The first group includes the pilot channel signal SCP and the signals of the odd communication channels (SCi with i odd). The second group includes the service channel signal SCS and the signals of the even communication channels (SCi with i even). The signals of the first group are respectively delivered, after digital-to-analog conversion 14, to inputs of the adder 16 which outputs the in-phase modulation component I. The signals of the second group are respectively delivered, after digital-to-analog conversion 14, to inputs of the adder 17 which outputs the quadrature modulation component Q. Thus, there exists a relative phase shift of $\pi/2$ between the channels signals of the first group and of the second group.

Other schemes may be used for distributing the channel signals among the two groups. In particular, it is possible to make use of protocols allowing to balance the power transmitted in the two groups depending on the traffic. However, as explained herebelow, it is convenient to impose a fixed predetermined phase shift between the pilot channel signal and the service channel signal.

A straightforward generalization of the modulator of FIG. 3 can be used in the case where stage 20 is similar to a $2^n$-state phase shift keying stage, n designating an integer. In this case, n modulation components are required for modulating respective radio waves having phase shifts multiple of $\pi/2^{n-1}$ therebetween. Accordingly, the channel signals are distributed in n groups, and the signals of each group are summed to form the n modulation components. The diagram of FIG. 3 corresponds to the particular case n=2.

In the embodiment of FIG. 4, a particular phase shift $\phi_i$ is assigned to each channel signal. Each channel signal SCi (i=P, S, 1, . . . , m) is multiplied on the one hand by $\cos \phi_i$ and on the other hand by $\sin \phi_i$, as symbolically indicated by blocks 63 and 64 and FIG. 4. After the digital-to-analog conversion 14, the product SCi×$\cos \phi_i$ is adressed to an input of the adder 16, and the product SCi×$\sin \phi_i$ is adressed to an input of the adder 17. In the illustrated example, $\phi_p=0$ for the pilot channel, and $\phi_s=\pi/2$ for the service channel, which simplifies the processing of those two channels as shown.

Under such circumstances, the transmitted radio signal can be expressed as:

$$\left[ \sum_i SCi \times \cos\phi_i \right] \cos(wt) - \left[ \sum_i SCi \times \sin\phi_i \right] \sin(wt) = \sum_i SCi \times \cos(wt + \phi_i) \quad (2)$$

whereby the phase shifts $\phi_i$ applied between the different CDMA channels in the radio signal are made apparent. It is also apparent that, due to the use of real spreading sequences, the effective modulation of each channel signal SCi is merely a two-state modulation, although the carrier modulation stage 20 is of the QPSK type and thus there are both in-phase and quadrature components. It can also be verified that the diagram of FIG. 3 is equivalent to the diagram of FIG. 4 when $\phi_i = 0$ or $\pi/2$ for each channel.

With the modulator of FIG. 4, various protocols may be used to assign the phases $\phi_i$ to the different channels. Generally, it will be interesting to distribute the phases in a relatively uniform way in the interval $[0,\pi[$. A suitable implementation of this is to use a dichotomic procedure: the values $\phi_p = 0$ and $\phi_s = \pi/2$ being fixed, it is possible to select $\phi_1 = \pi/4$, $\phi_2 = 3\pi/4$, $\phi_3 = \pi/8$, $\phi_4 = 3\pi/8$, $\phi_5 = 5\pi/8$, $\phi_6 = 7\pi/8$, $\phi_7 = \pi/16$, etc. . . . as and when communication channels i are opened.

In FIG. 4, the weighted summation of the channel signals is performed for the I component by the weighting blocks 63 and the adder 16, and for the Q component by the weighting blocks 64 and the adder 17. It will be understood that various other schemes can be considered for the weighted summations, for instance weighting may be performed by adjusting the analog reference voltage of the converters 14.

The phase shift $\phi_i$ ($1 \leq i \leq m$) assigned by the base station to each voice communication channel is included in the data DS(t) transmitted over the service channel. Each mobile station is in a position to receive these data DS(t) since it knows a priori the spreading sequence CS and the predetermined phase shift $\phi_s$ ($=\pi/2$ in the example described herein) assigned to the service channel. Thus, the mobile station is able to determine the phase shift $\phi_k$ which is assigned to the voice communication channel allocated thereto during a communication. Since the mobile station also knows the corresponding spreading sequence Ck (the spreading sequence indentifies the mobile station), it can receive the information bits Dk(t) intended therefor, by means of a CDMA demodulator such as the one shown in FIG. 5.

The radio signal received on antenna 31 is amplified, filtered, and input to the carrier demodulation stage 34 which is identical to the one of FIG. 2. An in-phase component $r_I$ and a quadrature component $r_Q$ are thus obtained. If, for simplifying the explanations without affecting their generality, it is considered that there is only one non-noisy propagation path between the transmitting base station and the receiving mobile station, expression (2) of the radio signal yields:

$$r_I = A \times \sum_i SCi \times \cos(\phi_i + \phi) \quad (3)$$

and $$r_Q = A \times \sum_i SCi \times \sin(\phi_i + \phi) \quad (4)$$

where $Ae^{j\phi}$ is an estimation of the response of the propagation paths, with A corresponding to the attenuation and $\phi$ corresponding to the phase shift of the response.

Hence, by calculating a complex number Xk having as a real part the correlation between the in-phase component $r_I$ and the spreading sequence Ck corresponding to channel k, and as an imaginary part the correlation between the quadrature component $r_Q$ and the sequence Ck, we obtain:

$$\begin{aligned} Xk &= \frac{1}{T_b} \times \int_{T_b} (r_I + jr_Q) \times Ck\, dt \\ &= \frac{A}{T_b} \sum_i \int_{T_b} Di \times e^{j(\phi_i - \phi)} \times Ci \times Ck\, dt \\ &= A \times Dk \times e^{j(\phi_k + \phi)} + \\ &\quad \frac{A}{T_b} \sum_{i \neq k} Di \times e^{j(\phi + \phi_i)} \int_{T_b} Ci \times Ck\, dt \end{aligned} \quad (5)$$

the correlations being calculated on the duration of one bit. Knowing $\phi_k$ and after having estimated $Ae^{j\phi}$, it is then possible to calculate:

$$Xk \times Ae^{j(\phi_k + \phi)} = \quad (6)$$

$$A^2 \times Dk + \frac{A^2}{T_b} \sum_{i \neq k} Di \times e^{j(\phi_i - \phi_k)} \int_{T_b} Ci \times Ck\, dt$$

This expression is representative of the information bit Dk received on channel k. The second term represent the second order noise generated by the other CDMA channels, the cross-correlation $$\frac{1}{T_b} \int_{T_b} Ci \times Ck\, dt$$

being substantially smaller than 1 on average. Owing to the coefficient $e^{j(\phi_i - \phi_k)}$ due to the relative phase shift applied according to the invention, the noise generated by channel $i \neq k$ is distributed between the real part and the imaginary part of the signal. Since the decision as to the value of bit Dk is made on the real axis, the influence of the noise generated by channel i is reduced in proportion to the cosinus of $\phi_i - \phi_k$. Therefore, the relative power of the interferers-generated noise may be reduced, on average by 3 dB while using real spreading sequences.

When it is desired to take advantage of multiple paths between the base station and the mobile station, a rake receiver is used to process the modulation components $r_I$ and $r_Q$, each arm of the receiver having the configuration shown in FIG. 5 and performing the reception from a particular path, and the bit produced by the different receiver arms being combined in order to reduce the error rate. Referring to FIG. 5, each receiving arm includes three processing modules 71,81,91 for respectively processing the pilot channel, the service channel and a voice communication channel k.

Initial synchronization of the spreading sequences for one path can, for instance, be carried out as described in French Patent Application No. 93 07 269. Then, the generators 72,82,92 of modules 71,81,91 can deliver the spreading sequences CP, CS, Ck synchronously.

Each of the modules 71,81,91 comprises two correlators 73 and 74, 83 and 84, 93 and 94 which respectively calculate, on the duration of a bit, the correlation between the component $r_I$ and the corresponding spreading sequence CP, CS, Ck, and the correlation between the component $r_Q$ and the same spreading sequence. The output signals of the two correlators 73 and 74, 83 and 84, 93 and 94 constitute, respectively, the real part and the imaginary part of the above-defined complex signal XP, XS, Xk.

Since $\phi_p = 0$ for the pilot channel, the complex signal XP produced by module 71 represents the estimation of the response $Ae^{j\phi}$ of the propagation path (see formula (5)). This estimation may be provided to the management unit of the rake receiver so that the path under consideration be taken into account only if the attenuation gain A is not too low. In 75, the complex conjugate of XP, $XP^* \approx Ae^{-j\phi}$, is calculated. The complex multiplier 86 multiplies the latter complex number XP* by $-j=e^{-j\pi/2}$ so as to provide an estimation of $Ae^{-j(\phi+\pi/2)}$ which takes into account the phase shifts $\phi$ and $\phi_s=\pi/2$.

Module 81 comprises a complex multiplier 87 which multiplies the complex signal XS by the estimation provided by multiplier 86. Considering formula (6), the real part of the output signal of multiplier 87 represents the estimation of the data bit DS received on the service channel. This estimation is adressed to the threshold comparator 88 to obtain the value of bit DS. The successive values of the bit DS are delivered to a service channel processing unit 89. From the data DS, unit 89 extracts the phase $\phi_k$ assigned to the communication channel k, and adresses a signal representing the complex number $e^{-j\phi k}$ to a complex multiplier 96.

The other input of multiplier 96 receives the complex number XP* provided by block 75. Thus, multiplier 96 provides an estimation of $Ae^{-j(\phi+\phi k)}$ which takes into account the phase shifts $\phi$ and $\phi_k$.

Module 91 comprises a complex multiplier 97 which multiplies the complex signal Xk by the estimation provided by multiplier 96. Considering formula (6), the real part of the output signal of multiplier 97 represents the estimation of the information bit Dk received on the voice communication channel. This estimation is addressed to the threshold comparator 98 to obtain the value of bit Dk. The information bits Dk received can then be decoded to restore the transmitted voice signals.

The modulator and the demodulator according to the invention have a structure much simpler than those previously known which made use of complex sequences. For instance, the modulator of FIG. 3 or 4 involves a single multiplier 61 to perform spectrum spreading in each CDMA channel instead of two 12, 13 in the conventional modulator of FIG. 1. And the demodulator of FIG. 5 involves two correlators 93, 94 per CDMA channel, instead of four correlators 47 in the conventional demodulator of FIG. 2.

Figure 6:
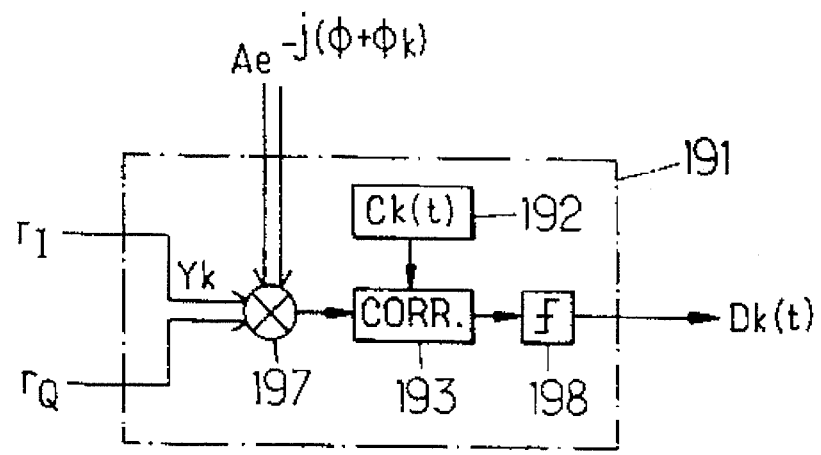
FIG. 6 is a diagram partially showing an alternative embodiment of the demodulator of FIG. 5.

When the circuits used allow for complex multiplication operations at the digital sampling rate of the components $r_I$ and $r_Q$, it is even possible to use only one correlator in each CDMA channel processing module of the demodulator. Such alternative embodiment of the processing module is shown in FIG. 6. The module 191 comprises a complex multiplier 197 having an input which receives the complex number Yk having the in-phase component $r_I$ as a real part and the quadrature component $r_Q$ as an imaginary part, and another input which receives the estimation of $Ae^{-j(\phi+\phi k)}$. With the expressions (3) and (4) of components $r_I$ and $r_Q$, the real part of the output signal of multiplier 197 can be written:

$$A^2 \times Dk \times Ck + A^2 \sum_{i \neq k} Di \times Ci \times \cos(\phi_i - \phi_k)$$

Then, a correlator 193 calculates, on the duration of a bit, the correlation between this real part and the spreading sequence Ck of the channel delivered by the generator 192 in order to provide the estimation of the information bit Dk received over the channel. This estimation is addressed to the threshold comparator 198 to obtain the value of bit Dk.

A processing module similar to module 191 can also be used to process the service channel.

In the foregoing, modules 71,81, 91,191 which directly process the in-phase and quadrature components $r_I, r_Q$ are described. Alternatively, the sum $r_I+r_Q$ and the difference $r_I-r_Q$ may be calculated at the output of the carrier demodulation stage 34, the calculated sum and difference constituting other components which are mutually in quadrature, and which can be processed identically by the modules 71,81, 91,191, whereby the estimations addressed to the multipliers 87,97,197 correspond to the quantities $A\sqrt{2}\times e^{-j(\phi+\phi i+\pi/4)}$. Besides, without departing from the scope of the invention, these estimations may be obtained in different ways, provided that they take correctly into account the phase shift $\phi$ introduced by a propagation path and the phase shift $\phi_i$ assigned to the processed CDMA channel.

With regard to the uplinks from a mobile station to a base station, spreading sequences having only one real component may also be used. The different CDMA channels are each established by a mobile station using its spreading sequence Ck. The base station receives the transmitted signals over different CDMA channels with relative phase shifts which, oil average, are uniformely distributed in the interval $[0,2\pi[$, due to the different propagation paths followed by the radio signal transmitted by different mobile stations. The interferers-generated noise can therefore be reduced owing to such phase shifts as in the case of the downlinks.

Figure 7:
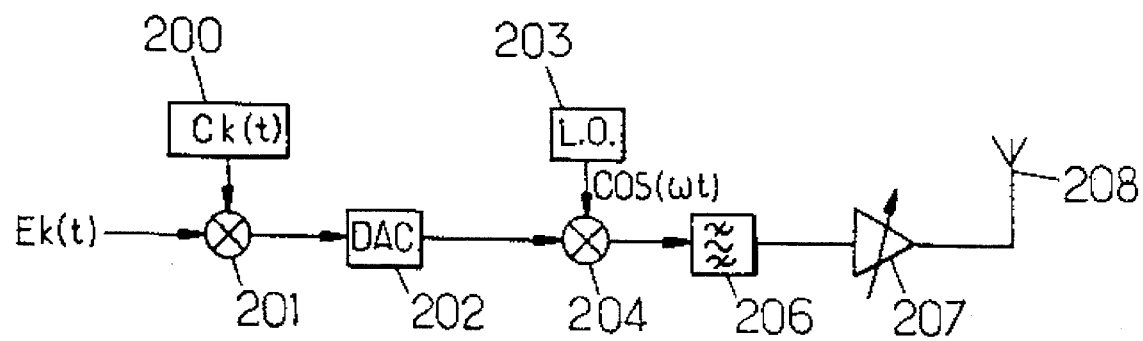
FIG. 7 is a diagram showing a modulator for use in the transmission part of a mobile station.

In the transmission part of the mobile station, it is sufficient that the carrier modulation stage merely performs binary phase shift keying (BPSK) as illustrated in FIG. 7.

In the modulator of FIG. 7, the encoded bits Ek to be transmitted by the mobile station are modulated, in 201, by the spreading sequence Ck delivered by the generator 200. After the digital-to-analog conversion 202, the channel signal thereby formed modulates, in mixer 204, a carrier wave provided by the local oscillator 203. The radio signal is then passed to the low-pass filter 206, and then amplified in 207 and transmitted by antenna 208. As usual in CDMA systems the amplifier 207 has an adjustable gain, to allow for controlling the power of the signal transmitted by the mobile station (see U.S. Pat. No. 5,056,109 and WO-92 21196).

We claim:

1. A transmission method for code-division multiple access radiotelephone communications, said method comprising, at a base station, the steps of:

providing n groups of CDMA channels, n being an integer greater than 1, each CDMA channel being associated with respective spreading sequence having only one real component;

assigning each one of a plurality of distinct information bit stream to a respective one of said CDMA channels;

for each of said CDMA channels, forming a respective spread spectrum signal by modulating the information bits of the stream assigned thereto with the spreading sequence associated therewith;

for each one of said n group, summing the spread spectrum signals formed for the CDMA channels of said one of said n groups to form a respective modulation component;

modulating each modulation component with a respective radio wave of n radio waves, said n radio waves having a common radio frequency and phase shifts of a multiple of $\pi/2^{-1}$ therebetween;

summing the n modulated components to form a radio signal; and transmitting said radio signal to mobile stations.

2. A method according to claim 1, wherein one of the CDMA channels is a pilot channel whose spread spectrum signal comprises a pilot sequence, and wherein another one of the CDMA channels is a service channel over which information bits are transmitted, containing data relating to the group distribution of the CDMA channels.

3. A method according to claim 2, wherein the pilot channel and the service channel are respectively distributed into two predetermined groups.

4. A method according to claim 1, wherein an uplink radio signal transmitted from a mobile station to a base station is a CDMA signal in which information bits are modulated by a spreading sequence having only one real component, and then modulated on a carrier frequency by phase shift keying.

5. A method according to claim 1, wherein the reception by a mobile station of information bits transmitted by said base station over a CDMA channel includes:

a carrier demodulation step which includes mixing a radio signal received from said base station with two radio waves at said radio frequency having a phase shift of $\pi/2$ therebetween, so as to produce, respectively, an in-phase component and a quadrature component;

computing a first correlation between the in-phase component and the spreading sequence associated with said CDMA channel;

computing a second correlation between the quadrature component and the spreading sequence associated with said CDMA channel; and multiplying a complex number, having said first correlation as a real part and said second correlation as an imaginary part, with an estimation taking into account a phase shift introduced by a propagation path and another phase shift depending on which one of the n groups includes said CDMA channel, so as to obtain a signal representative of the information bits transmitted over said CDMA channel.

6. A method according to claim 5, wherein one of the CDMA channels is a pilot channel whose spread spectrum signal comprises a pilot sequence, and wherein the phase shift introduced by the propagation path is estimated from a complex number having, as a real part, a correlation between the pilot sequence and the in-phase component, and, as an imaginary part, a correlation between the pilot sequence and the quadrature component.

7. A method according to claim 6, wherein the CDMA channel further include a service channel over which information bits are transmitted, containing data relating to the group distribution of the CDMA channels, wherein the the pilot channel and the service channel are respectively distributed into two predetermined groups, and wherein, at the mobile station, the reception of information bits transmitted over another CDMA channel is carried out after recovering the one of the n groups which includes said other CDMA channel from said data contained in the information bits received over the service channel.

8. A method according to claim 1, wherein the reception by a mobile station of information bits transmitted by said base station over a CDMA channel includes:

a carrier demodulation step which includes mixing a radio signal received from said base station with two radio waves at said radio frequency having a phase shift of $\pi/2$ therebetween, so as to produce, respectively, an in-phase component and a quadrature component;

multiplying a complex number, having said in-phase component as a real part and said quadrature component as an imaginary part, with an estimation taking into account the phase shift introduced by a propagation path and another phase shift depending on which one of the n groups includes said CDMA channel; and correlating the real part of the result of said multiplication with the spreading sequence associated with said CDMA channel, so as to obtain a signal representative of the information bits transmitted over said CDMA channel.

9. A method according to claim 8, wherein one of the CDMA channels is a pilot channel whose spread spectrum signal comprises a pilot sequence, and wherein, the phase shift introduced by the propagation path is estimated from a complex number having, as a real part, a correlation between the pilot sequence and the in-phase component, and, as an imaginary part, a correlation between the pilot sequence and the quadrature component.

10. A method according to claim 9, wherein the CDMA channels further include a service channel over which information bits are transmitted, containing data relating to the group distribution of the CDMA channels, wherein the pilot channel and the service channel are respectively distributed into two predetermined groups, and wherein, at the mobile station, the reception of information bits transmitted over another CDMA channel is carried out after recovering the one of the n groups which includes said other CDMA channel from said data contained in the information bits received over the service channel.

11. A transmission method for code-division multiple access radiotelephone communications, comprising, at a base station, the steps of:

forming a plurality of spread spectrum signals from respective spreading sequences modulating respective information bits to be transmitted over respective CDMA channels, each CDMA channel being associated with a spreading sequence having only one real component and each of said spread spectrum signals having associated therewith a respective first phase shift;

calculating a first modulation component by summing a first group of spread spectrum signals respectively weighted by cosines of the first phase shifts respectively associated therewith;

calculating a second modulation component by adding a second group of spread spectrum signals respectively weighted by sines of the first phase shifts respectively associated therewith;

modulating each of said first and second modulation components with a respective radio wave, the two radio waves having a common radio frequency and a second phase shift of $\pi/2$ therebetween;

summing the two modulated components to form a radio signal; and transmitting said radio signal to mobile stations.

12. A method according to claim 11, wherein the first phase shifts assigned to the spread spectrum signals are selected in the interval $\{0,\pi\}$ according a dichotomic procedure.

13. A method according to claim 11, wherein one of the CDMA channels is a pilot channel whose spread spectrum signal consists of a pilot sequence, and wherein another one of the CDMA channels is a service channel over which information bits are transmitted, containing data relating to the first phase shifts assigned to the spread spectrum signals.

14. A method according to claim 13, wherein a fixed predetermined first phase shift is assigned to the spread spectrum signal of the service channel with respect to the pilot sequence.

15. A method according to claim 11, wherein an uplink radio signal transmitted from a mobile station to a base station is a CDMA signal in which information bits are modulated by a spreading sequence having only one real component, and then modulated on a carrier frequency by phase shift keying.

16. A method according to claim 11, wherein the reception by a mobile station of information bits transmitted by said base station over a CDMA channel includes:
   a carrier demociulation step which includes mixing a radio signal received from said base station with two radio waves at said radio frequency having a phase shift of $\pi/2$ therebetween, so as to produce, respectively, an in-phase component and a quadrature component;
   computing a first correlation between the in-phase component and the spreading sequence associated with said CDMA channel;
   computing a second correlation between the quadrature component and the spreading sequence associated with said CDMA channel; and
   multiplying a complex number, having said first correlation as a real part and said second correlation as an imaginary part, with an estimation taking into account a third phase shift introduced by a propagation path and the first phase shift assigned to the spread spectrum signal relating to said CDMA channel, so as to obtain a signal representative of the information bits transmitted over said CDMA channel.

17. A method according to claim 16, wherein one of the CDMA channels is a pilot channel whose spread spectrum signal consists of a pilot sequence, and wherein said third phase shift is estimated from a complex number having, as a real part, a correlation between the pilot sequence and the in-phase component, and, as an imaginary part, a correlation between the pilot sequence and the quadrature component.

18. A method according to claim 17, wherein the CDMA channels further include a service channel over which information bits are transmitted, containing data relating to the first phase shifts assigned to the spread spectrum signals, wherein a fixed predetermined first phase shift is assigned to the spread spectrum signal of the service channel with respect to the pilot sequence, wherein, at the mobile station, reception of the information bits transmitted over the service channel is carried out by using said fixed predetermined first phase shift, and wherein, at the mobile station, the reception of information bits transmitted over another CDMA channel is carried out by using a first phase shift corresponding to a first phase shift determined from said data contained in the information bits received over the service channel.

19. A method according to claim 11, wherein the reception by a mobile station of information bits transmitted by said base station over a CDMA channel includes:
   a carrier demodulation step which includes mixing a radio signal received from said base station with two radio waves at said radio frequency having a phase shift of $\pi/2$ therebetween, so as to produce, respectively, an in-phase component and a quadrature component;
   multiplying a complex number, having said in-phase component as a real part and said quadrature component as an imaginary part, with an estimation taking into account a third phase shift introduced by a propagation path and the first phase shift assigned to the spread spectrum signal relating to said CDMA channel; and
   correlating the real part of the result of said multiplication with the spreading sequence corresponding to said CDMA channel, so as to obtain a signal representative of the information bits transmitted over said CDMA channel.

20. A method according to claim 19, wherein one of the CDMA channels is a pilot channel whose spread spectrum signal consists of a pilot sequence, and wherein said third phase shift is estimated from a complex number having, as a real part, a correlation between the pilot sequence and the in-phase component, and, as an imaginary part, a correlation between the pilot sequence and the quadrature component.

21. A method according to claim 20, wherein the CDMA channels further include a service channel over which information bits are transmitted, containing data relating to the first phase shifts assigned to the spread spectrum signals, wherein a fixed predetermined first phase shift is assigned to the spread spectrum signal of the service channel with respect to the pilot sequence, wherein, at the mobile station, reception of the information bits transmitted over the service channel is carried out by using said fixed predetermined first phase shift, and wherein, at the mobile station, the reception of information bits transmitted over another CDMA channel is carried out by using a first phase shift corresponding to a first phase shift determined from said data contained in the information bits received over the service channel.

22. A CDMA modulator for producing a downlink radio signal from a base station to mobile stations of a radiotelephone network, wherein there are provided n groups of CDMA channels, n being an integer greater than 1, each CDMA channel being associated with a respective spreading sequence having only one real component, and wherein each of a plurality of distinct information bit stream is assigned to a respective one of said CDMA channels, said modulator comprising:
   spectrum spreading means for forming a respective spread spectrum signal for each one of said CDMA channels by modulating the information bits of the stream assigned thereto with the spreading sequence associated therewith;
   n adders, each receiving the spread spectrum signals formed for the CDMA channels of a respective one of said n groups, and producing a respective modulation component and
   carrier modulation means for modulating each modulation component with a respective radio wave of n radio waves, the n radio waves having a common radio frequency and phase shifts of a multiple of $\pi/2^{n-}$ therebetween and for summing the n modulated components to form said downlink radio signal.

23. A CDMA modulator for producing a downlink radio signal from a base station to mobile stations of a radiotelephone network, comprising:
   spectrum spreading means for forming a plurality of spread spectrum signals by modulating respective information bits to be transmitted with respective spreading sequences each having only one real component;
   first weighted summation means for adding first group of spread spectrum signals respectively weighted by cosines of first phase shifts respectively associated therewith, and outputting an in-phase modulation component;
   second weighted summation means for adding a second group of spread spectrum signals respectively weighted by sines of the first phase shifts respectively associated therewith, and outputting a quadrature modulation component; and
   carrier modulation means for respectively modulating said in-phase and quadrature modulation components with two radio waves having a common frequency and a second phase shift of π/2 therebetween, for summing the two modulated components to form said downlink radio signal.

24. A CDMA demodulator, for processing, at a mobile station of a radiotelephone network, a downlink radio signal received from a base station of said network, said downlink radio signal supporting a plurality of CDMA channels, each CDMA channel being associated with a respective spreading sequence and with a respective first phase shift, said demodulator comprising:

carrier demodulation means for mixing said radio signal with two radio waves having a common radio frequency and a second phase shift of π/2 therebetween, so as to produce an in-phase component and a quadrature component;

a first correlator calculating a correlation between the in-phase component and the spreading sequence associated with one of the CDMA channels;

a second correlator calculating a correlation between the quadrature component and said spreading sequence;

a complex multiplier having an input which receives a complex number having respectively, as real and imaginary parts, the outputs of said first and second correlators, and another input which receives a complex number whose argument is representative of the sum of a third phase shift introduced by a propagation path and the first phase shift associated with said one of the CDMA channels; and comparison means receiving the real part of the output of the complex multiplier and restoring information bits transmitted over said one of the CDMA channels.

25. A CDMA demodulator, for processing, at a mobile station of a radiotelephone network, a downlink radio signal received from a base station of said network, said downlink radio signal supporting a plurality of CDMA channels, each CDMA channel being associated with a respective spreading sequence and with a respective first phase shift, said demodulator comprising:

carrier demodulation means for mixing said radio signal with two radio waves having a common radio frequency and a second phase shift of π/2 therebetween, so as to produce, respectively, an in-phase component and a quadrature component;

a complex multiplier having an input which receives a complex number having respectively, as real and imaginary parts, the in-phase and quadrature components, and another input which receives a complex number whose argument is representative of the sum of a third phase shift introduced by a propagation path and the first phase shift associated with one of said CDMA channels;

a correlator calculating a correlation between the real part of the output of the complex multiplier and the spreading sequence associated with said one of the CDMA channels; and comparison means receiving the output of the correlator and restoring the information bits transmitted over said one of the CDMA channels.

* * * * *

UNITED STATES PATENT AND TRADEMARK OFFICE
CERTIFICATE OF CORRECTION

PATENT NO. : 5,544,167
DATED : August 6, 1996
INVENTOR(S) : LUCAS, et al

It is certified that error appears in the above-indentified patent and that said Letters Patent is hereby corrected as shown below:

| | |
|---|---|
| column 10, line 45: | insert --a-- between "with" and "respective"; |
| column 10, line 48: | delete "stream" and insert --streams--; |
| column 10, line 53: | delete "group" and insert --groups--; |
| column 10, line 61: | delete "$\pi/2^{-1}$" and insert --$\pi/2^{n-1}$--; |
| column 14, line 27: | delete "stream" and insert --streams--; |
| column 14, line 43: | delete "$\pi/2^{n-}$" and insert --$\pi/2^{n-1}$--; and |
| column 14, line 55: | insert --a-- between "adding" and "first". |

Signed and Sealed this

Twenty-ninth Day of December, 1998

Attest:

BRUCE LEHMAN

Attesting Officer

Commissioner of Patents and Trademarks